United States Patent [19]

Zirin

[11] 4,289,360
[45] Sep. 15, 1981

[54] BEARING DAMPER SYSTEM

[75] Inventor: Louis I. Zirin, Marblehead, Mass.

[73] Assignee: General Electric Company, Lynn, Mass.

[21] Appl. No.: 69,196

[22] Filed: Aug. 23, 1979

[51] Int. Cl.³ .................... F16C 35/067; F16C 27/04
[52] U.S. Cl. ............................. 308/178; 308/207 R; 308/236
[58] Field of Search ............... 308/1 A, 178, 184 R, 308/184 A, 194, 216, 207 R, 236, DIG. 15

[56] References Cited

U.S. PATENT DOCUMENTS

| | | | |
|---|---|---|---|
| 2,659,637 | 11/1953 | Barr | 308/207 R |
| 3,357,757 | 12/1967 | Morley et al. | 308/184 R |
| 3,473,853 | 10/1969 | Goss et al. | 308/184 R |
| 3,727,998 | 4/1973 | Haworth et al. | 308/184 R |
| 4,046,430 | 9/1977 | Buono et al. | 308/26 |
| 4,175,803 | 11/1979 | Roberts | 308/207 R |

FOREIGN PATENT DOCUMENTS

| | | | |
|---|---|---|---|
| 556981 | 12/1974 | Switzerland | 308/DIG. 15 |
| 726791 | 3/1955 | United Kingdom . | |
| 1071049 | 6/1967 | United Kingdom . | |
| 1418907 | 12/1975 | United Kingdom . | |
| 1421377 | 1/1976 | United Kingdom . | |
| 2033024 | 5/1980 | United Kingdom . | |

Primary Examiner—Richard R. Stearns
Attorney, Agent, or Firm—Henry J. Policinski; Derek P. Lawrence; Donald W. Walk

[57] ABSTRACT

Apparatus for supporting a rotating member such as a shaft associated with a gas turbine engine, is provided wherein the relative movement between a bearing assembly and a bearing support is prevented during a first mode of operation wherein the rotating member is rotating in a normal balance condition and relative movement is permitted during a second mode of operation wherein the rotating member is rotating in an abnormal balance condition.

2 Claims, 1 Drawing Figure

BEARING DAMPER SYSTEM

BACKGROUND OF THE INVENTION

This invention relates to apparatus for supporting a rotating member or shaft which may become subject to high unbalance forces under operating conditions.

Rotating shafts, particularly those associated with modern day gas turbine engines, may encounter abnormally severe unbalance conditions during the course of engine operation. Typically, these conditions may arise when elements, such as one or more of the plurality of blades mounted on a disc attached to the shaft, are damaged and separate from the rotating disc. The combination of severe unbalance and critical speed within the operating range of the rotating shaft may effect significant vibratory loads that could result in severe rubs or, in the extreme, rapid bearing or structural failure.

Prior art attempts have been made to address the severe unbalance conditions caused by separation of a rotating blade. Typically, attempts have been made to place the critical speed outside of the operating range of the engine by adjusting the mass and flexibility of the rotating element. Since this approach increases the weight of the engine, fuel consumption of the engine has correspondingly increased. Additionally, since any number of rotating blades may separate from the engine, the exact vibration response, and hence critical speed, is difficult to predict. For these and other reasons then, adjustments to the mass and critical speed of the engine have not proved to be entirely satisfactory.

Another prior art approach, addressing the severe unbalance condition described above, provided a damper in the bearing support structure which dampened the radial movement of the shaft. More specifically, dampers employing a squeeze film concept were found to be particularly adaptable in reducing the consequences of a severe unbalance condition. However, this approach introduces additional operating clearances, associated with the damper, into the bearing support. These clearances may be effective, during certain conditions under normal operation of the engine, to permit radial movement of the rotating shaft. In other words, the shaft has a soft, rather than firm support under normal engine operating conditions. The rotating blades associated with the shaft then rub on the stationary components of the engine causing larger clearances between the blade tips and the stationary components to exist under normal operating conditions. Hence, the efficiency of the engine is reduced. The present invention addresses the problem associated with soft support of the rotating shaft.

SUMMARY OF THE INVENTION

It is, therefore, an object of the present invention to provide a support system for a rotating shaft.

It is another object of the present invention to provide a support system for a rotating shaft subject to high unbalance conditions during its operating life.

Briefly stated, these and other objects which will become apparent from the following specification and appended drawings are accomplished by the present invention which, in one form, comprises a rotating shaft or member, a bearing assembly disposed adjacent the rotating member and a bearing support for supporting the bearing assembly during rotation of the member. Means are provided for controlling movement of the bearing assembly with respect to the bearing support wherein relative movement between the bearing assembly and the support is prevented during a first mode of operation and relative movement is permitted during a second mode of operation. Means may also be provided for damping the relative movement in the second mode.

BRIEF DESCRIPTION OF THE DRAWING

While the specification concludes with claims particularly pointing out and distinctly claiming the subject matter which is regarded as part of the present invention, the invention will be more fully understood from the following description of the preferred embodiment which is given by way of example with the accompanying drawing wherein:

DESCRIPTION OF THE PREFERRED EMBODIMENT

Figure 1:
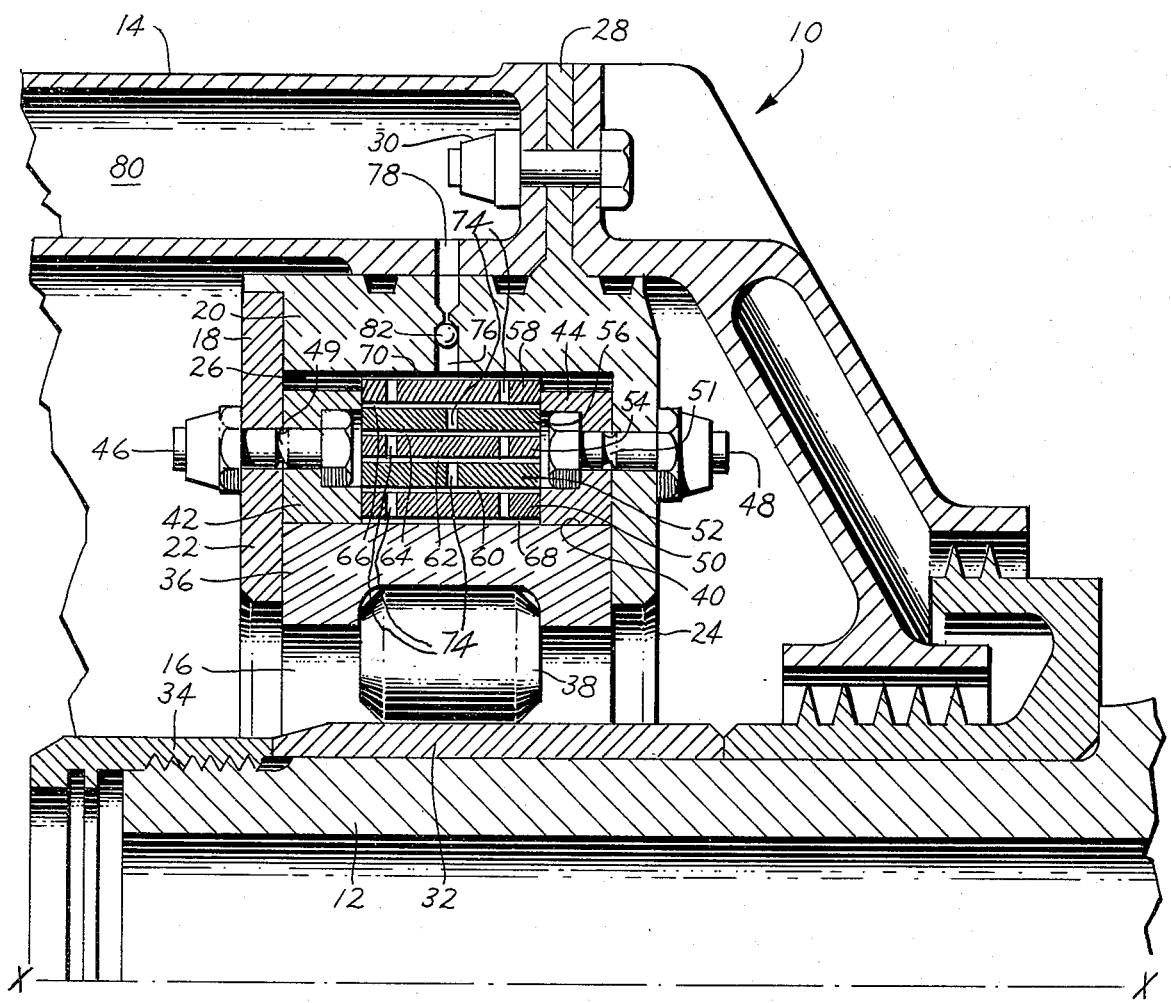
FIG. 1 depicts a fragmentary cross-sectional view of a shaft support system of a gas turbine engine.

Referring to FIG. 1, there is depicted generally at 10 a fragmentary cross-sectional view of a shaft support portion of a gas turbine engine. The engine may be of one of a number of types, as by way of example, a turbofan, turbojet, or turboshaft engine. Since the general structure and operation of these types of engines is well known to those skilled in the art a detailed description of such general structure and operation is deemed to be unnecessary for an understanding of the present invention.

A hollow member or shaft 12, for example a turbine shaft, is adapted to rotate about axis X—X. For purposes of describing the present invention, the term "axial" as hereinafter used shall mean a direction generally along the X—X axis, the term "radial" shall mean a direction generally radial to the X—X axis and the term "circumferential" shall mean a direction circumferential to the X—X axis. As is observed in FIG. 1, hollow shaft 12 extends axially along axis X—X and circumferentially about the X—X axis.

Disposed radially spaced from shaft 12, a structural member 14 generally circumscribes bearing assembly 16 and bearing support housing 18 each located between shaft 12 and structural member 14. Bearing support housing 18 extends generally axially along and circumferentially about axis X—X and is generally U-shaped in cross-section with the opening of the U facing generally radially inward. Housing 18 includes a base portion 20 in abutting engagement with structural member 14 and a pair of axially spaced apart leg portions 22 and 24 depending radially inwardly from base portion 20. Leg portion 22, 24 cooperate with base portion 20 to form a recess 26 for purposes hereinafter to be described. Housing 18 further includes a mounting flange 28 extending radially outward from base portion 20 for fixedly securing housing 18 to structural member 14 via fastening means in the form of nut and bolt assembly 30.

Bearing assembly 16 includes an inner bearing race member 32 fixedly secured to rotating shaft 12 by nut member 34 threaded onto one end of shaft 12. Bearing assembly 16 further includes an outer bearing race 36 and a bearing member, in the form of roller bearing 38, which is adapted to engage race members 32 and 36 to facilitate rolling support of shaft 12 during rotation thereof. Outer race member 36 at least partially resides within recess 26 and is in engagement with each of legs 22, 24 of U-shaped support housing 18. As will hereinafter be described outer race member 36 is adapted in one mode of operation to move radially within recess 26.

Outer race member 36 includes a radially outwardly facing, axially and circumferentially extending surface 40 in abutment with a pair of spaced-apart annular rings 42 and 44 disposed within recess 26 adjacent legs 22 and 24 respectively. Means, in the form of shear pins 46 and 48, are provided for controlling movement of bearing assembly 16 with respect to bearing support 18. More specifically, pins 46 and 48 are rigidly affixed to legs 22 and 24, respectively, and maintain rings 42 and 44, respectively, in engagement with surface 40 of outer race 36. Each pin 46 and 48 serves as a means for securing race member 36 against relative movement with respect to support housing 18 during a first mode of operation. Means in the form of notches 49 and 51, are provided for obviating the effect of pins 46 and 48 to provide for relative movement of outer race 36 and bearing support housing 18 during a second mode of operation in a manner to be described. Disposed axially between shear pins 46 and 48 within recess 26 are damping means in the form of a plurality of annular radially adjacent shim members 50, 52, 54, 56, and 58, each of which has an outer diameter slightly smaller than the inner diameter of the next radially outer adjacent shim. In this manner then, a plurality of axially extending gaps are provided in the form of gap 60 between shims 50 and 52, gap 62 between shims 52 and 54, gap 64 between shims 54 and 56, and gap 66 between shims 56 and 58. A gap 68 is also disposed between outer race 36 and the radially innermost shim 50 while gap 70 is disposed between base portion 20 of housing 18 and the radially outermost shim 58. Shims 50, 52, 54, 56, and 58 are adapted to move relative to one another and each is provided with a plurality of apertures 74 extending radially across each shim and providing a fluid path between the gaps on each side of the shim. That is to say, by way of example, apertures 74 in shim 50 provide a fluid path between gap 68 and gap 60 disposed respectively on the radially inner and outer sides of shim 50. Similarly the apertures 74 in shim 52 provide a fluid path between gap 60 and gap 62 disposed respectively on the radially inner and outer sides of shim 52. Similar arrangements are provided for shims 54, 56, and 58.

Passageway 76, disposed in base portion 20 of housing 18, communicates with aperture 78 disposed in structural member 14, which is in turn in communication with chamber 80. Passageway 76 is provided with a check valve 82 which provides for fluid flow only in one direction, toward recess 26. Chamber 80 is connected to a source of fluid under pressure (not shown) and, hence, pressurized fluid may flow through aperture 78, passageway 76 and into recess 26. Fluid occupying recess 26 is distributed through apertures 74 so as to infiltrate into the gaps, 68, 60, 62, 64, and 66, and 70, and provide a thin film of fluid between each shim 50, 52, 54, 56, and 58.

In a first mode of operation, when the shaft 12 is rotating in a normal balance connection, the shear pins 46 and 48 are adapted to prevent relative movement between bearing assembly 16 and bearing support housing 18. More specifically, in this first mode, a firm load path is established from outer race 36, through rings 42 and 44, legs 22 and 24, base portion 20 to support structure 14. Hence, rotating shaft 12 is held firmly and in a relatively fixed radial position with respect to structure 14 and hence rubbing between rotating blades and stationary components of the engine is prevented. Furthermore, in this first mode, shim 50, 52, 54, 56, and 58 are ineffective to provide a damping function.

In the event shaft 12 encounters a severe unbalance condition, such as that caused by the loss of one or more bladed elements associated with the shaft, shear pins 46 and 48 will fracture at the reduced cross-section notched areas 49 and 51, respectively. In this second mode of operating outer race 36, and hence bearing assembly 16 and shaft 12, may move relative to bearing support housing 18. More specifically, the unbalance condition of shaft 12, results in its eccentrically orbiting about the X—X axis causing the circumferential outer race member 36 to orbit within circumferential recess 26. At any specific circumferential location, the orbiting movement of race member 36 results in the race member 36 moving radially further into and radially further out of recess 26. In moving further into the recess 26, the race member 36 tends to press shims 50, 52, 54, 56, and 58 toward each other. Since fluid occupies the gaps 60, 62, 64, 66, 68, and 70 the fluid is displaced through apertures 74 and in the circumferential direction as the gap distances are reduced at the aforementioned specific circumferential location. In this manner then, damping of the movement of race member 36 and hence bearing assembly 16 is accomplished. While radial movement of the shaft may then occur, such motion is damped, severe vibration of the engine is avoided and the engine may shut down for repair without severe damage to other components.

While the preferred embodiment of the present invention has been depicted and described, it should be appreciated that modifications and alterations may be made in the embodiment without departing from the scope of the invention as set forth in the appended claims:

I claim:

1. The invention comprising:
   a rotating member;
   an annular bearing assembly operatively associated with and surrounding said rotating member, said bearing assembly including at least an outer annular race member;
   a bearing support housing for supporting said bearing assembly during rotation of said rotating member, said housing including an annular recess having said race member at least partially disposed therein;
   an axially spaced pair of annular members disposed in said recess in said housing and fitting about said race member;
   at least one shearable element fixedly connecting each of said annular members to said housing and effective for securing said annular members against movement within said recess and thereby retaining said race member concentric relative to said support housing during a first mode of operation when said rotating member is rotating in a normal balanced condition and being subject to shearing when said rotating member is rotating in an abnormal unbalanced condition during a second mode of operation for thereby permitting relative movement of said race member and annular members within said recess; and
   means for damping disposed in said recess in said bearing support housing and between said spaced pair of annular members for damping any relative movement of said race member within said recess.

2. The invention comprising:
   a rotating member;

an annular bearing assembly operatively associated with and surrounding said rotating member, said bearing assembly including at least an outer annular race member;

a bearing support housing for supporting said bearing assembly during rotation of said rotating member, said housing including an annular recess having said race member at least partially disposed therein;

an axially spaced pair of annular members disposed in said recess in said housing and fitting about said race member;

at least one shearable element fixedly connecting each of said annular members to said housing and effective for securing said annular members against movement within said recess and thereby retaining said race member concentric relative to said support housing during a first mode of operation when said rotating member is rotating in a normal balanced condition and being subject to shearing when said rotating member is rotating in an abnormal unbalanced condition during a second mode of operation for thereby permitting relative movement of said race member and annular members within said recess;

means for damping disposed in said recess for damping any relative movement of said race member within said recess and including a plurality of annular radially adjacent shim members each having an outer diameter slightly smaller than the inner diameter of the next radially outer adjacent shim member, and each having a plurality of apertures extending radially thereacross for providing a fluid path through said shim members; and a fluid disposed within said recess about and between said shim members and within said apertures therein whereby upon eccentric rotation of said rotating member and said bearing assembly during said second mode of operation, said fluid is caused to flow through said apertures in said shim members for effecting damping.

* * * * *